United States Patent
Birmiwal et al.

(10) Patent No.: US 11,652,726 B2
(45) Date of Patent: May 16, 2023

(54) FRAGMENT MODIFICATION OF ROUTING CONTROL FUNCTIONS

(71) Applicant: Arista Networks, Inc., Santa Clara, CA (US)

(72) Inventors: Sharad Birmiwal, Surrey (CA); Matthieu Loriol, Vancouver (CA); Keon Vafai, Milpitas (CA)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 17/398,321

(22) Filed: Aug. 10, 2021

(65) Prior Publication Data

US 2023/0069356 A1 Mar. 2, 2023

(51) Int. Cl.
*H04L 45/02* (2022.01)
(52) U.S. Cl.
CPC ................... *H04L 45/02* (2013.01)
(58) Field of Classification Search
CPC ....... H04L 45/02; H04L 45/03; H04L 45/033; H04L 45/036; H04L 45/037; H04L 45/0377; H04L 2012/562
USPC .......................................................... 370/254
See application file for complete search history.

(56) References Cited

U.S. PATENT DOCUMENTS

| | | | | |
|---|---|---|---|---|
| 7,370,092 | B2 * | 5/2008 | Aderton | G06F 8/65 709/203 |
| 8,400,941 | B2 * | 3/2013 | Gray | H04L 43/50 370/254 |
| 2018/0351862 | A1 * | 12/2018 | Jeganathan | H04L 45/02 |
| 2018/0351863 | A1 * | 12/2018 | Vairavakkalai | H04L 45/02 |

* cited by examiner

*Primary Examiner* — Anthony Mejia
(74) *Attorney, Agent, or Firm* — Tianyi He

(57) ABSTRACT

A network device that provides packet forwarding services includes: a command line interface and a route manager. The command line interface is programmed to: obtain a command, for updating a routing control function, that specifies positional information; identify a portion of the routing control function based on the positional information; identify a syntactic style associated with the portion of the routing control function; make a modification to the routing control function to obtain a modified routing control function; and update operation of the network device based on the modified routing control function. The route manager is programmed to process a route for forwarding packets of the network device based on the modified routing control function, after the operation of the network device is updated, to obtain a processed route for forwarding the packets.

20 Claims, 8 Drawing Sheets

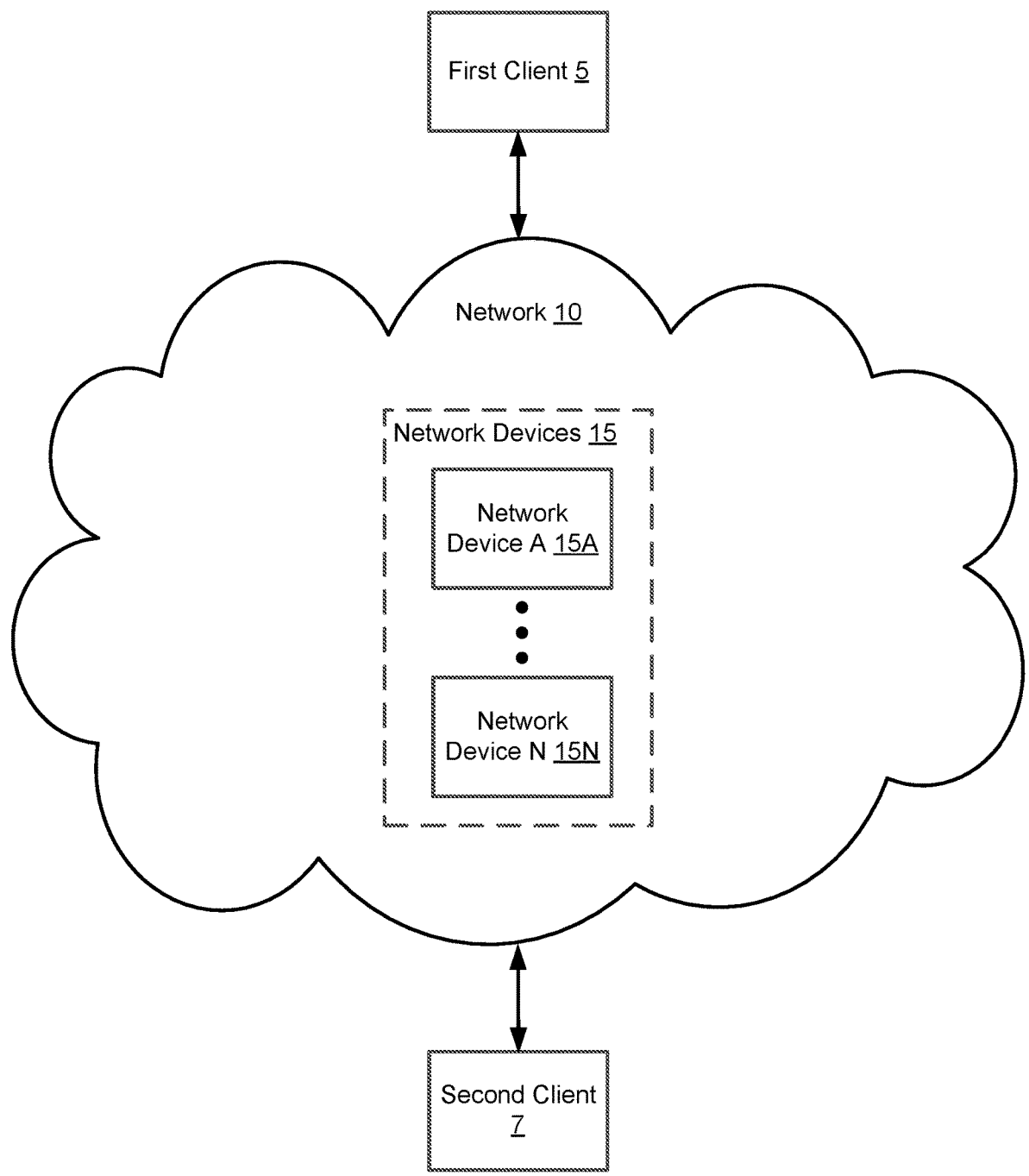
FIG. 1.1

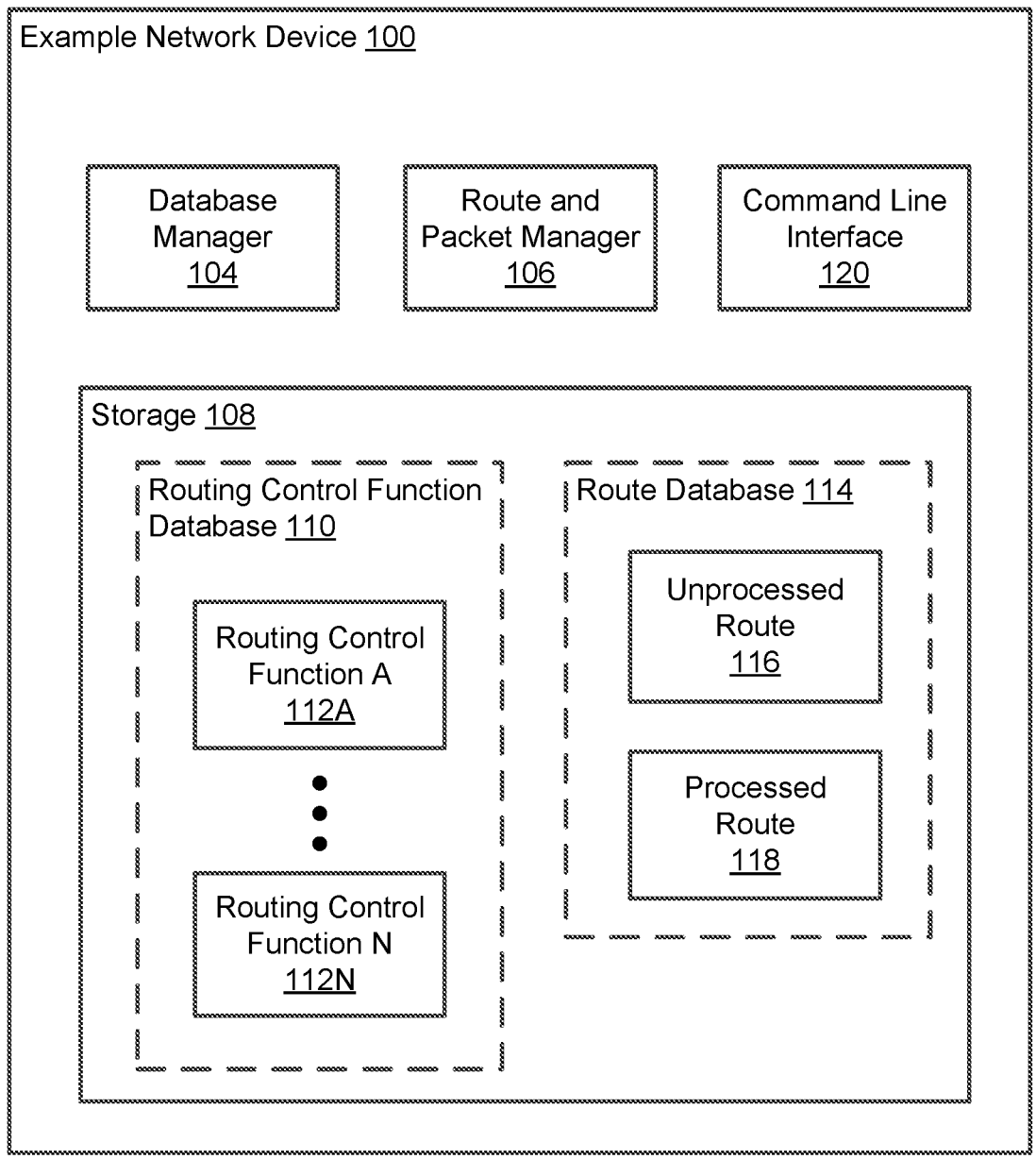
FIG. 1.2

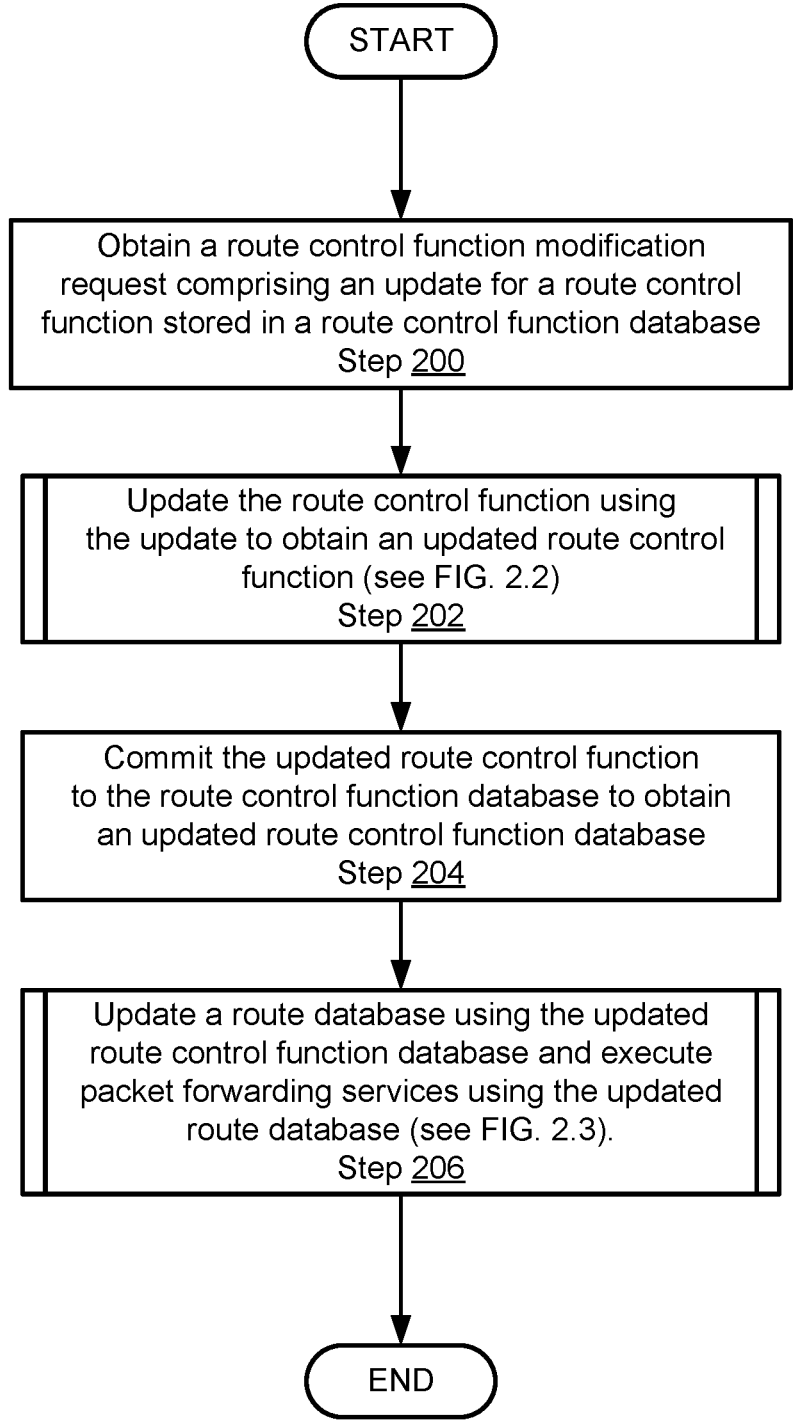
FIG. 2.1

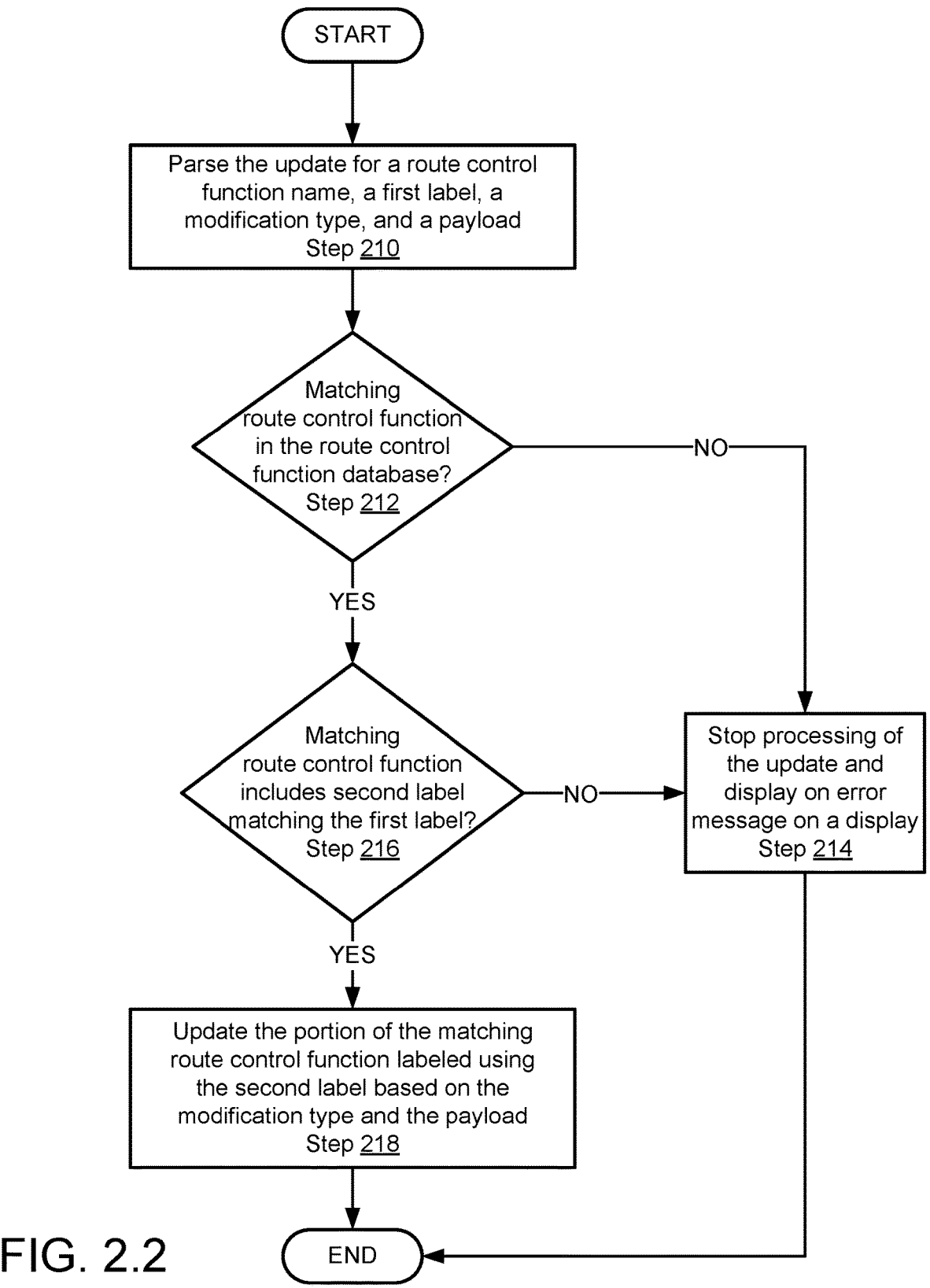
FIG. 2.2

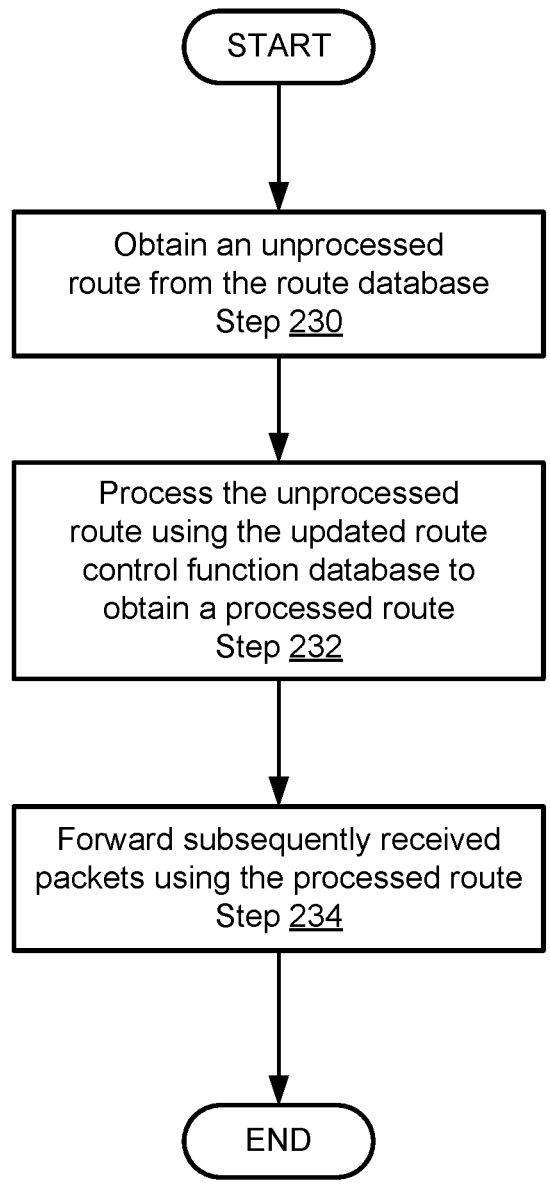
FIG. 2.3

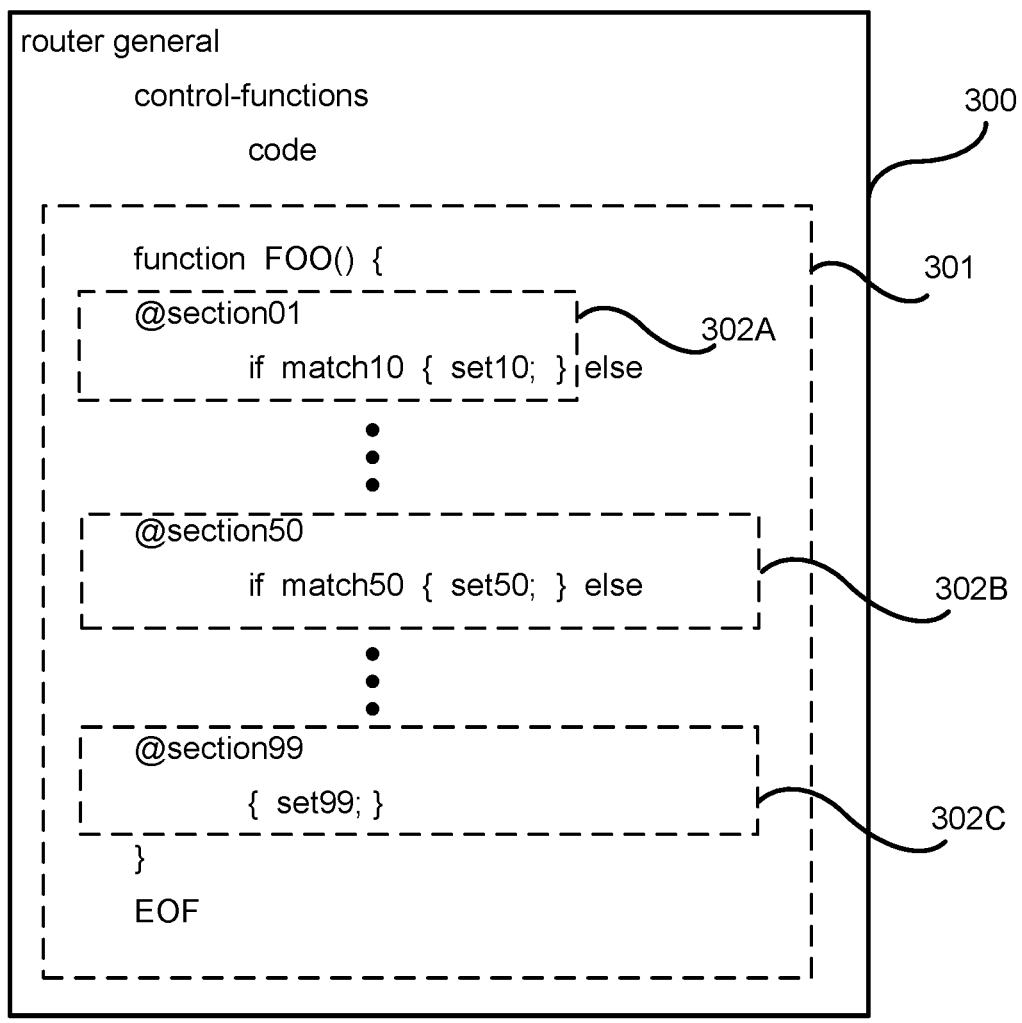
FIG. 3.1

```
code insert if-block function FOO before @section50
@section101
        if match5 { set5; }
EOF
```

FIG. 3.2

```
router general
    control-functions
        code
        function FOO() {
            @section01
                if match10 { set10; } else
                    •
                    •
                    •
            @section101
                if match5 { set5; } else
            @section50
                if match50 { set50; } else
                    •
                    •
                    •
            @section99
                { set99; }
        }
        EOF
```

FIG. 3.3

FRAGMENT MODIFICATION OF ROUTING CONTROL FUNCTIONS

BACKGROUND

A communication system may enable devices to communicate with one another. The communication system may include devices that relay information from a sending device to a destination device.

BRIEF DESCRIPTION OF DRAWINGS

Certain embodiments disclosed herein will be described with reference to the accompanying drawings. However, the accompanying drawings illustrate only certain aspects or implementations of the embodiments disclosed herein by way of example and are not meant to limit the scope of the claims.

FIG. 1.1 shows a logical diagram of a system in accordance with one or more embodiments disclosed herein.

FIG. 1.2 shows a logical diagram of a network device in accordance with one or more embodiments disclosed herein.

FIG. 2.1 shows a flowchart of a method in accordance with one or more embodiments disclosed herein.

FIG. 2.2 shows a flowchart of a method in accordance with one or more embodiments disclosed herein.

FIG. 2.3 shows a flowchart of a method in accordance with one or more embodiments disclosed herein.

FIGS. 3.1-3.3 show a non-limiting example of modifying a fragment of a routing control function.

DETAILED DESCRIPTION

Figure 4:
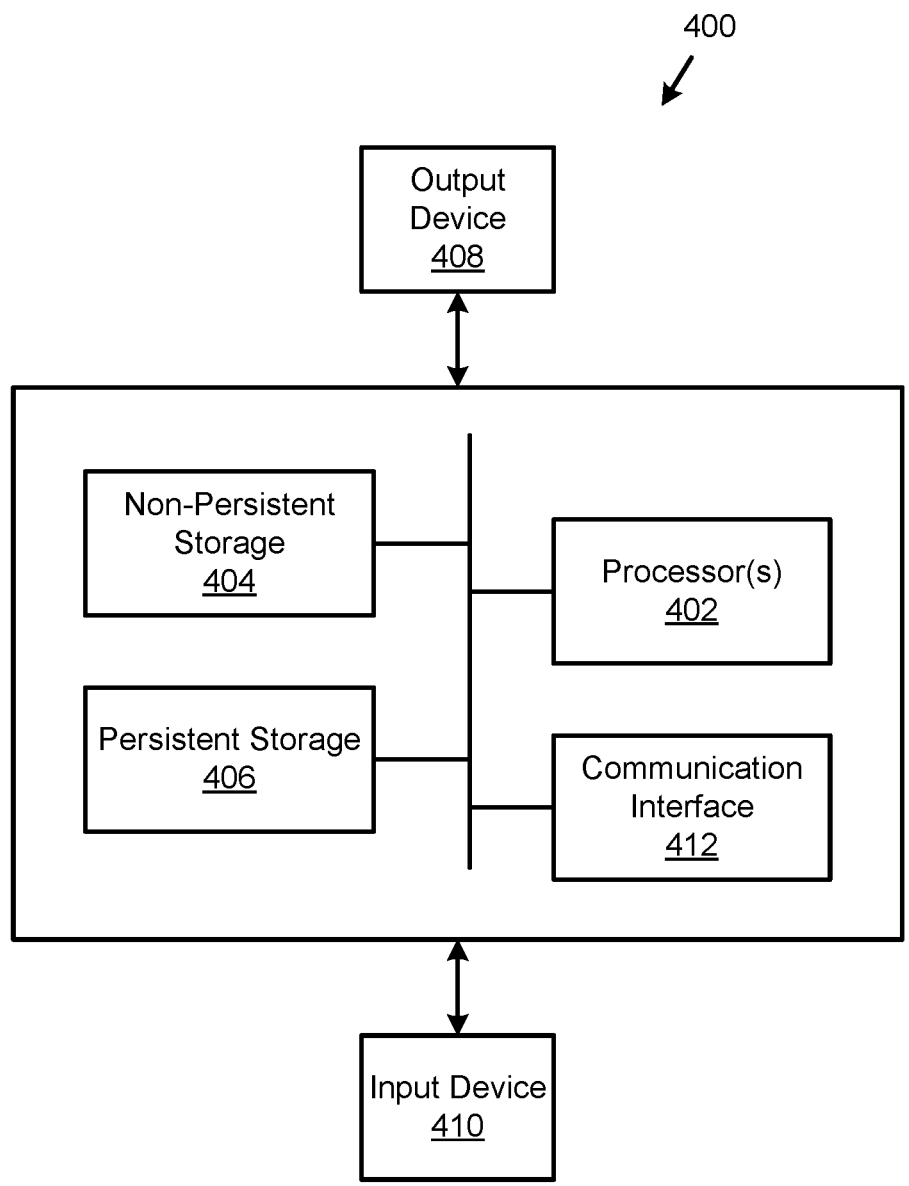
FIG. 4 shows a logical diagram of a computing device in accordance with one or more embodiments disclosed herein.

Network devices (e.g., switches) aggregate various types of information in a database (e.g., Arista Networks, Inc.'s Sysdb database). Agents hosted by these network devices use this information to configure and manage the operation of the network devices. Routing Control Functions (RCFs) are one type of information stored in the database. RCFs are stored as person-readable text and define policies that govern some of the functionality of the network devices. The person-readable text may be long in length and meet specific syntax requirements (and may also be difficult to interpret if certain optional stylistic rules are not met).

Over time, small changes to RCFs may need to be implemented to cause the network devices to respond to various network operation conditions. However, conventional processes for modifying RCFs and committing the changes to the RCFs to the database are onerous. In particular, to commit such changes to the database, an administrator may need to edit the entire RCF body (i.e., all of the code making up the RCF) even when only a single line change or other minor changes are desired. Once the RCF is modified, it is then committed to the database thereby updating the configuration and/or operation of a network device. This approach is problematic in that it: (i) places a large burden on administrators for updating the operation of network devices; (ii) increases the chance for errors being included in the modified RCFs; and (iii) consumes large amounts of the network devices' resources when the entirety of the RCF, rather than just the modified fragments, is recommitted.

Embodiments of this disclosure relate to systems, devices, and methods for improving the manageability of RCFs and/or other types of policies usable to configure and/or manage the operation of a network device. To manage the RCFs, (i) labels are added to the RCFs, and (ii) a command line interface (CLI) for editing the RCFs based on the labels is provided. The CLI enables granular changes to the RCF body to be made and commitment of only these granular changes rather than recommitting the entire RCF body as a new version of the RCF. Consequently, the process of implementing RCF based policies is reduced in complexity, the chance of errors in the RCFs is reduced, and the network devices' computing resources are more effectively managed.

Additionally, the use of a CLI enables a number of automated features to be added for RCF policy management. These features include, but are not limited to, (i) automatic syntactic error detection that reduces the chance for error introduction via changes to RCFs and (ii) detection and implementation of stylistic features in the RCFs that improve the manageability of RCFs modified via the CLI. For example, desirable levels of indentation may be automatically implemented in the modified RCFs thereby reducing the cognitive burden on administrators when reading and interpreting the modified RCFs.

In the text that follows, a description of components of a system in accordance with embodiments of the disclosure is provided with respect to FIGS. 1.1-1.2. A description of methods that may be performed by the system of FIG. 1.1 is provided with respect to FIGS. 2.1-2.3. An example of a series of actions that may be performed by the system of FIG. 1.1 is provided with respect to FIGS. 3.1-3.3. Lastly, a description of a computing device that may be used to implement the system of FIG. 1.1 is provided with respect to FIG. 4.

Specific embodiments will now be described with reference to the accompanying figures. In the following description, numerous details are set forth as examples. It will be understood by those skilled in the art, and having the benefit of this document, which one or more embodiments described herein may be practiced without these specific details and that numerous variations or modifications may be possible without departing from the scope of the embodiments. Certain details known to those of ordinary skill in the art may be omitted to avoid obscuring the description.

In the following description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, operably connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

FIG. 1.1 shows a diagram of an example system in accordance with one or more embodiments described herein. The system may include clients (e.g., 5, 7) that communicate with one another (and/or other devices not illustrated in FIG. 1.1) using network (10). To enable clients to communicate with one another, network (10) may provide services to the clients including network data unit (e.g., packet) forwarding services. By providing network data unit forwarding services, network (10) may enable clients to communicate with each other and/or other devices.

To provide network data unit forwarding services, network (10) may include any number of network devices (15). Network devices (15) may implement any number and/or type of communication protocols that enable network data units provided to network (10) by clients (e.g., 5, 7) to be provided to devices to which the network data units are addressed.

To implement these communication protocols, network devices (15) may store routing configurations for processing paths used for forwarding one or more network data units from one network device (15) to another. These routing configurations may be stored in a database of each respective network device (15) as one or more routing control functions (RCFs) including person-readable text (e.g., programming code), and are used to update an operation (e.g., the network data unit forwarding services) of each respective network device (15). In particular, these routing configurations may be used to decide whether to accept or reject a route and whether to modify attributes of a route.

Any of the components of FIG. 1.1 may be operably connected by any combination and/or number of wired and/or wireless connections.

Any of the devices of FIG. 1.1 may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 2.1-2.3. The devices of FIG. 1.1 may be implemented using other types of computing devices without departing from the embodiments disclosed herein. For additional details regarding computing devices, refer to FIG. 4.

The devices of FIG. 1.1 may be implemented using logical devices without departing from the embodiments disclosed herein. For example, the devices of FIG. 1.1 may be implemented using virtual machines that utilize computing resources of any number of physical computing devices (refer to FIG. 4) to provide their respective functionalities. The devices of FIG. 1.1 may be implemented using other types of logical devices without departing from the embodiments disclosed herein.

Furthermore, in one or more embodiments disclosed herein, a network device is implemented as a physical device that includes and/or is operatively connected to persistent storage (not shown), memory (e.g., random access memory (RAM)) (not shown), one or more processor(s) (e.g., integrated circuits) (not shown), and at least one physical network interface (not shown), which may also be referred to as a port. Examples of a network device (e.g., 15, FIG. 1.1) include, but are not limited to, a network switch, a router, a multilayer switch, a fiber channel device, an InfiniBand® device, etc. A network device (e.g., 15, FIG. 1.1) is not limited to the aforementioned specific examples.

In one or more embodiments disclosed herein, a network device (e.g., 15A, 15N, FIG. 1.1) includes functionality to receive network data units (e.g., frames, packets, tunneling protocol frames, etc.) at any of the physical network interfaces (i.e., ports) of the network device (e.g., 15, FIG. 1.1) and to process the network data units (collectively "network traffic"). In one or more embodiments disclosed herein, processing a network data unit includes, but is not limited to, a series of one or more table lookups (e.g., longest prefix match (LPM) lookups, forwarding information lookups, etc.) and corresponding actions (e.g., forward from a certain egress port, add a labeling protocol header, rewrite a destination address, encapsulate, etc.). Such a series of lookups and corresponding actions may be referred to as a pipeline. Examples of pipeline processing include, but are not limited to, performing a lookup to determine: (i) whether to take a security action (e.g., drop the network traffic data unit); (ii) whether to mirror the network traffic data unit; and/or (iii) how to route/forward the network data unit in order to transmit the network data unit from an interface of the network device (e.g., 15A, 15N, FIG. 1.1).

In one or more embodiments, a network device (e.g., 15A, 15N, FIG. 1.1) also includes and/or is operatively connected to device persistent storage and/or device memory (i.e., non-transitory computer readable media used to provide persistent storage resources and/or memory resources) storing software and/or firmware.

Such software and/or firmware may include instructions which, when executed by the one or more processors) of a network device (e.g., 15A, 15N, FIG. 1.1), cause the one or more processors to perform operations in accordance with one or more embodiments described herein.

The software instructions may be in the form of computer readable program code to perform embodiments described herein, and may be stored, in whole or in part, temporarily or permanently, on a non-transitory computer readable medium such as a CD, DVD, storage device, a diskette, a tape, flash memory, physical memory, or any other non-transitory computer readable medium. The software instructions may also be stored remotely (e.g., in a remote network device) and retrieved (i.e., pulled and/or fetched) from the remote location.

In one or more embodiments, the network device (e.g., 15A, 15N, FIG. 1.1) is part of a network (e.g., 10, FIG. 1.1). A network may refer to an entire network or any portion thereof (e.g., a logical portion of the devices within a topology of devices). A network may include a datacenter network, a wide area network, a local area network, a wireless network, a cellular phone network, or any other suitable network that facilitates the exchange of information from one part of the network to another. In one or more embodiments, the network may be coupled with or overlap, at least in part, with the Internet.

In one or more embodiments, a network includes a collection of one or more network devices (e.g., network devices (e.g., 15, FIG. 1.1)) that facilitate network connectivity for one or more operatively connected devices (e.g., computing devices, data storage devices, other network devices, etc.). In one or more embodiments, the network devices (e.g., 15, FIG. 1.1) and other devices within the network (not shown) are arranged in a network topology (not shown). In one or more embodiments, a network topology is an arrangement of various elements of a network.

In one or more embodiments, a computing device is any device or any set of devices capable of electronically processing instructions and may include, but is not limited to, any of the following: one or more processors (not shown), memory (e.g., random access memory (RAM)) (not shown), input and output device(s) (not shown), persistent storage (not shown), one or more physical interfaces (e.g., network ports) (not shown), any number of other hardware components (not shown) or any combination thereof. Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a network device (e.g., switch, router, multi-layer switch, etc.) such as that described above and below, a virtual machine, and/or any other type of computing device with the aforementioned requirements.

To further clarify aspects of network devices, a diagram of an example of a network device is provided in FIG. 1.2. Any of the network devices (15) of FIG. 1.1 may be similar to the example network device illustrated in FIG. 1.2.

FIG. 1.2 shows a logical diagram of an example network device (100) in accordance with one or more embodiments described herein. Example network device (100) may provide network data unit forwarding services (i.e., packet forwarding services).

To provide the above noted functionality of example network device (100), example network device (100) may include database manager (104), route and packet manager (106), storage (108), and command line interface (CLI) (120). Each of these components of the example network device (100) is discussed below.

In one or more embodiments disclosed herein, database manager (104) is implemented using a hardware device including circuitry. Database manager (104) may include, for example, one or more of a digital signal processor, a field programmable gate array, and/or an application specific integrated circuit. The circuitry of the aforementioned devices may be adapted to provide the functionality of managing (e.g., editing, updating, configuring, etc.) one or more databases stored in the storage (108). Database manager (104) may be implemented using other types of hardware devices without departing from the embodiments disclosed herein.

In one or more embodiments disclosed herein, database manager (104) is implemented using computing code stored on a persistent storage that when executed by a processor of the example network device (100) performs the functionality of database manager (104). The processor may be a hardware processor including circuitry such as, for example, a central processing unit or a microcontroller. The processor may be other types of hardware devices for processing digital information without departing from the embodiments disclosed herein.

In one or more embodiments disclosed herein, database manager (104) provides database management services. The database management services may include adding, removing, and/or modifying data (e.g., the RCFs) making up one or more database structures stored in the storage (108) based on one or more instructions received by the CLI (120), and updating the respective database structures based on the aforementioned adding, removing, and/or modifying.

In one or more embodiments disclosed herein, the route and packet manager (106) is implemented using a hardware device including circuitry. Route and packet manager (106) may include, for example, one or more of a digital signal processor, a field programmable gate array, and/or an application specific integrated circuit. The circuitry of the aforementioned devices may be adapted to provide the functionality of the route and packet manager (106). Route and packet manager (106) may be implemented using other types of hardware devices without departing from the embodiments disclosed herein.

In one or more embodiments disclosed herein, route and packet manager (106) is implemented using computing code stored on a persistent storage that when executed by a processor of example network device (100) performs the functionality of the route and packet manager (106). The processor may be a hardware processor including circuitry such as, for example, a central processing unit or a microcontroller. The processor may be other types of hardware devices for processing digital information without departing from the embodiments disclosed herein.

Route and packet manager (106) may provide route establishment and packet forwarding services. The route establishment and packet forwarding services may include (i) establishing a route (e.g., path) with one or more other network devices, (ii) identifying how to process a packet being forwarded on an established route (i.e., setting the rules and configurations of the established route), and (iii) forwarding the processed packets on the established route.

To establish and set up a route's configuration, route and packet manager (106) may utilize one or more routing control functions (112A, 112N) making up the RCF database (110). Additionally, to process packets being forwarded to other network devices, route and packet manager (106) may utilize one or more routes stored in the route database (114).

In one or more embodiments disclosed herein, CLI (120) is implemented using hardware devices including circuitry. CLI (120) may include, for example, one or more of a digital signal processor, a field programmable gate array, and/or an application specific integrated circuit. The circuitry of the aforementioned devices may be adapted to provide the functionality of CLI (120). CLI (120) may be implemented using other types of hardware devices without departing from the embodiments disclosed herein.

In one or more embodiments disclosed herein, CLI (120) is implemented using computing code stored on a persistent storage that, when executed by a processor of example network device (100), performs the functionality of the CLI (120). The processor may be a hardware processor including circuitry such as, for example, a central processing unit or a microcontroller. The processor may be other types of hardware devices for processing digital information without departing from the embodiments disclosed herein.

CLI (120) may provide RCF modification services. RCF modification services may include (i) providing instructions to the database manager (104) to make one or more modifications to RCFs (112A, 112N) in the RCF database (110), (ii) receiving instructions from a user (e.g., a network administrator or a user of one of the clients (5, 7)) to modify one or more RCFs (112A, 112N), and/or (iii) parsing the instructions from the user to determine the changes being made to the RCFs (112A, 112N) to compile the instructions to the database manager (104).

By doing so, CLI (120) may directly enable granular changes to one or more RCFs (112A, 112N) to be implemented and committed by the network device (100). This prevents a user from having to obtain a full copy of an RCF (112A, 112N), make manual changes to the full copy, and re-configure the entire RCF database (110) through commitment of the full copy as a new version of the edited RCF.

Additionally, CLI (120) may enable a number of automated features to be added for RCF policy management. These features include, but are not limited to, (i) automatic syntactic error detection that reduces the chance for error introduction via changes to RCFs and (ii) detection and implementation of stylistic features in the RCFs that improve the manageability of RCFs modified via the CLI. For example, desirable levels of indentation may be automatically implemented in the modified RCFs thereby reducing the cognitive burden on administrators when reading and interpreting the modified RCFs. Examples of these automated features will be discussed in more detail below.

The combination of the database manager (104), the route and packet manager (106), and the CLI (120) may act as a single entity (e.g., a single processor of the network device (100)) to perform all, or a portion, of the methods illustrated in FIGS. 2.1-2.3 when providing all, or a portion, of its functionality.

In one or more embodiments disclosed herein, the storage (108) is implemented using devices that provide data storage services (e.g., storing data and providing copies of previously stored data). The devices that provide data storage services may include hardware devices. For example, storage (108) may include any quantity and/or combination of memory devices (i.e., volatile storage), long term storage devices (i.e., persistent storage), other types of hardware devices that may provide short term and/or long term data storage services.

For example, storage (108) may include a memory device (e.g., a dual in line memory device) in which data is stored and from which copies of previously stored data are provided. In another example, storage (108) may include a persistent storage device (e.g., a solid state disk drive) in which data is stored and from which copies of previously stored data is provided. In a still further example, storage (108) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage (108) may store data structures including a RCF database (110) and/or a route database (114). Each of these data structures is discussed below.

RCF database (110) may be implemented using one or more data structures. The data structures may include information regarding one or more routing configurations employed by a network device (100). The RCF database (110) may include any number of RCFs (112A, 112N).

For example, each of the RCFs (112A, 112N) may include one or more statements provided by a system administrator of the network device (100). A statement may refer to one or more routing protocol attribute names/identifiers (e.g., "local_preference") for the purposes of looking up and/or modifying the value of that routing protocol attribute. Each RCF (112A, 112N) may include statements for each respective network device connected to the network device (100). Alternatively, the RCFs (112A, 112N) may include universal statements for all other network devices connected to the network device (100).

In one or more embodiments disclosed, each statement in an RCF (112A, 112N) specifies at least a step for processing one or more routes established between the network device (100) and other connected network devices. Each RCF (112A, 112N) may also include human-readable text (e.g., programming code) in a format utilizing different syntactic styles (e.g., different level of indentations) that enables separable elements (e.g., each distinct portion of code) to be distinguished. In one or more embodiments, each RCF (112A, 112N) further includes one or more labels that delineate a one or more of portions of the content within each RCF (112A, 112N). A non-limiting example of an RCF (112A, 112N) will be discussed in more detail below in FIGS. 3.1-3.3.

In one or more embodiments disclosed, the one or more of labels may follow any type of scheme or rule that allows each portion of the RCF to be easily distinguished by a user (e.g., a system administrator) of the network device (100). The one or more of labels can also divide the contents of the RCF without changing the overall functionality of the human-readable text in the RCFs. Said another way, the labels act similarly to comments (i.e., a programmer-readable explanation and/or annotations) included in programming code. In one or more embodiments, the one or more labels may further be used to identify a position in the RCF (i.e., provide a positional information) for making one or more modifications.

As one non-limiting example, a labeled portion of the RCF may include a label followed by zero or more RCF statements delimited by curly braces and identified by a name (i.e., the label). For example, as shown below Example 1, the name may be a term preceded by a special character, and all RCF statements within the curly braces are associated with the name.

Start of Example 1

@name {
statement1;
statement2;
statement3;
. . .
}

End of Example 1

As another non-limiting example, the labeled portion may include a condition (e.g., a logical if statement) between the label and the curly braces encompassing the RCF statements. In this example, the function and all of the RCF statements within the curly braces would be associated with the given label. This is shown below in Example 2.

Start of Example 2

@name if <expr> {
statement1;
. . .
}

End of Example 2

In one or more embodiments disclosed, other derivatives based on above Example 1 and Example 2 may be applied to label portions of the RCF code. For example, a schema where each label included in a single RCF may be a unique, non-repeated name may be applied. For example, in above Example 2, the label is "@name".

Turning back to FIG. 1.2, routing database (114) may be implemented using one or more data structures. The data structures may include information based on the information included in the routing database (114). Routing database (114) may be maintained using any number and type of algorithm for maintaining one or more processed and/or unprocessed routes (116, 118) established between the network device (100) and other connected network devices. The information included in the routing database (114) may be organized in any manner without departing from embodiments disclosed herein.

In one or more embodiments, the routing database (114) includes one or more unprocessed routes (116) and processed routes (118). In the context of this disclosure, an unprocessed route (116) is a route that has not been updated after an operation of the network device (100) has been updated based on one or more modifications to at least one RCF (112A, 112N). In other words, an unprocessed route (116) is a route that has not been updated to include new routing protocol attribute values committed to the RCF database (110) by the database manager (104).

Consistent with the above definition, a processed route (118) is a route that has been updated to reflect any changes in the operation of the network device. Said another way, a processed route (118) is a route that has been updated to include new routing protocol attribute values committed to the RCF database (110) by the database manager (104).

As used with respect to RCF database (110) and routing database (114), maintain means to update (e.g., modify, delete, and/or add information) the aforementioned data structures in accordance with changes made to the information upon which the data structures are based. Updating may occur continuously, periodically, at scheduled points in time, responsively to changes, or in other manners. Consequently, the aforementioned data structures may not reflect the information upon which the data structures are based at all points in time.

While the data structures stored in storage (108) have been described as including a limited amount of specific information, any of the data structures stored in storage (108) may include additional, less, and/or different information without departing from the embodiments disclosed herein. Further, the aforementioned data structures may be combined, subdivided into any number of data structures, may be stored in other locations (e.g., in a storage hosted by another device), and/or spanned across any number devices without departing from the embodiments disclosed herein.

Additionally, while example network device (100) has been illustrated as including a limited number of specific components, example network device (100) may include fewer, different, and/or additional components without departing from embodiments disclosed herein.

FIG. 2.1 shows a flowchart in accordance with one or more embodiments disclosed herein. The method may be performed by, for example, one or more components of a network device (e.g., 100, FIG. 1.2). Other entities may perform the method of FIG. 2.1 without departing from embodiments disclosed herein.

While the various steps in the flowchart shown in FIG. 2.1 are presented and described sequentially, one of ordinary skill in the relevant art, having the benefit of this document, will appreciate that some or all of the steps may be executed in different orders, that some or all of the steps may be combined or omitted, and/or that some or all of the steps may be executed in parallel or partially overlapping in time or manner.

In Step 200, a route control function (RCF) modification request is obtained. The RCF modification request may be transmitted by an administrator/user of the network device and received through the command line interface (CLI) (e.g., 120, FIG. 1.2) of the network device. In one or more embodiments, the RCF modification may also be received through other programmatic interfaces (e.g., extended application programming interface (EAPI), Google Remote Procedure Calls (gRPC), etc.).

In one or more embodiments disclosed herein, the RCF modification request may include a command for updating RCFs stored in the RCF database. Alternatively, the RCF modification request may include multiple commands for updating one or more RCFs stored in the RCF database. The command for updating the RCF may include a name of the RCF to be updated (i.e., a RCF name), a first label matching a second label included in the RCF to be updated, a type of modification to be performed on the RCF, and a payload that specifies a change to the RCF. The type of modification may be one of a deletion, an addition, and/or a replacement. Examples of each of these modifications will be discussed in more detail below. An example of a command for updating the RCF will also be discussed in more detail below in FIGS. 3.1-3.3.

In one or more embodiments disclosed herein, the command for updating the RCF may not include the first label matching the second label included in the RCF to be updated. Rather, the command for updating the RCF may include a specific target position (e.g., beginning, end, before, after, etc.) within the RCF where the payload is to be inserted as the positional information. For example, in an addition (i.e., insertion) modification type, the command may include the target position such as, but is not limited to, "add at the end of a function" or "add at the beginning of a function." In one or more embodiments, the command may include both the label and the target position (e.g., add before @name) Additional details of these examples are shown below in Table 1.

In one or more embodiments disclosed herein, the payload may also specify one or more labels. Additionally, a label specified in the payload may be different from an existing label in the RCF to be updated. For example, in a replacement operation, a label specified in a payload may be different from an existing label to be replaced. This is essentially a rename operation where an existing label in the RCF to be updated is renamed into a new label. As yet another example, in addition and/or replacement operations, multiple labels may be specified in the payload. In other words, multiple labeled blocks (i.e., multiple blocks of code delimited by each of the added labels) may be added to or used to replace one or more blocks of existing code in the RCF to be updated.

In one or more embodiments disclosed herein, prior to receiving the RCF modification request, the RCF modification request may be processed (e.g., by a device separate from the network device) to determine whether execution of the RCF modification request would result in an error. Alternatively, the RCF modification request may be processed by the network device (100), and the network device (100) will notify the administrator/user that execution of the RCF modification request would result in an error.

In particular, in one or more embodiments, the type of modification in the command of the RCF modification request may include a class that identifies one or more types of programming code. Each portion of code in the RCF may also be associated with a class. The change specified by the payload (i.e., a content of the payload) may also include code associated with a class. Each class may be a unique, non-repeated name used to represent at least one type of programming code. As a non-limiting example, each logical if statement may be associated with an "if-block" class. As another non-limiting example, a sequence of labeled "if-blocks" connected by the term "else" may be associated with an "if-chain" class. A degenerate case of a single labeled "if-block" with no else clause may also be associated with the "if-chain" class. As yet another non-limiting example, one or more lines (i.e., blocks) of programming code representing an action (with or without being accompanied by any logic statements) may be associated with a "block" class. These examples are shown below in Table 1.

The RCF modification request is processed and/or analyzed, by the network device in Step 200, to determine whether: (i) a class specified in the command supports the operation of an instance of a class in the RCF to be updated; and (ii) a class specified in the command matches a class specified in the payload. In particular, turning to case (i) a first class specified in the command supports the operation of an instance of a second class in the RCF to be updated if the combination of the first class and a type of modification in the command can be applied with respect to the second class. The applicability of the first class and the type of modification to the second class is based on a set of predefined (e.g., by a user or administrator) rules. For example, the set of predefined rules may specify that a "block" class can be inserted (i.e., added using the addition modification) before another "block" and/or before a sequence of if-else statements making up an "if-chain" class. In contrast, and as a counter example, the set of predefined rules may specify that a "block" class cannot be inserted in between two "if-block" classes in a sequence of if-else statements. Furthermore, for case (ii) and applicable to any type of modification, the class specified in the command must match the class specified in the payload. Detailed examples of both cases (i) and (ii) are shown below in Table 1.

In Step 202, an RCF in the RCF database matching the RCF name in the command for updating the RCF is modified to obtain an updated RCF reflecting the type of modification. This step will be discussed in more detail below in FIG. 2.2.

In Step 204, the updated RCF is committed to the RCF database to obtain an updated RCF database. In one or more embodiments disclosed herein, the configurations and/or operations of the network device are updated based on the changes in the updated RCF that was committed. For example, if the updated RCF includes changes to how packets are processed on a specific route established between the network device and another network device on the network, these packet processing changes will be reflected by the network device once the updated RCF is committed to the RCF database.

In one or more embodiments disclosed, rather than recommitting an entirety of the RCF, only the modified portions of the RCF are committed. This advantageously prevents the need to re-express a large quantity of largely-unchanged routing configurations in the RCF if only granular modifications are made to the RCF.

In Step 206, the routes stored in the route database of the network device are updated using the updated RCF database to reflect the new/modified routing configurations to one or more existing routes between the network device and other connected network devices. Additionally, the network device executes packet forwarding services using the updated routes. This step will be discussed in more detail below in FIG. 2.3.

FIG. 2.2 shows a flowchart describing a method for updating an RCF in accordance with one or more embodiments disclosed herein. The method may be performed by, for example, one or more components of a network device (e.g., 100, FIG. 1.2). Other entities may perform the method of FIG. 2.2 without departing from embodiments disclosed herein.

While the various steps in the flowchart shown in FIG. 2.2 are presented and described sequentially, one of ordinary skill in the relevant art, having the benefit of this document, will appreciate that some or all of the steps may be executed in different orders, that some or all of the steps may be combined or omitted, and/or that some or all of the steps may be executed in parallel or partially overlapping in time or manner.

In Step 210, the command to update the RCF is parsed to identify the RCF name, the first label, and the type of modification to be made to the RCF. In the event that the command is a modification or an insertion, the command may also include a payload. In one or more embodiments disclosed herein, this parsing is executed by the CLI (e.g., 120, FIG. 1.2) of the network device, and the information parsed by the CLI is used to determine which RCF and what part of the RCF is to be updated. In particular, the RCF name identifies a specific RCF among the RCFs stored in the RCF database, the first label identifies a specific portion within the specific RCF that is to be updated, and the type of modification (in combination of with the payload) determines how the specific portion of the specific RCF is to be updated. A working example of a command for updating an RCF will be discussed in more detail below in FIGS. 3.2.

In Step 212, the CLI of the network device parses the RCF database (e.g., 110, FIG. 1.2) to determine whether an RCF with a name matching the RCF name included in the command exists. In one or more embodiments disclosed herein, if an RCF with a name matching the RCF name in the command does not exist in the RCF database (i.e., NO in Step 212), the method continues to Step 214 where the processing of the command is stopped and the CLI causes an error message to be displayed to the user. In particular, the error message will notify the user that the RCF specified by the user in the command does not exist.

If an RCF with a name matching the RCF name in the command exists in the RCF database (i.e., YES in Step 212), the CLI parses, in Step 216, the matching RCF to determine whether the matching RCF includes a second label that matches the first label included in the command. In one or more embodiments disclosed, the second label is one of the plurality of labels used to identify the portions of the RCF. If the CLI determines that the matching RCF does not include a second label matching the first label (i.e., NO is Step 216), the method returns to Step 214 (discussed above) where an error message is displayed to the user. In particular, the error message will notify the user that a label matching the first label specified by the user in the command does not exist in the RCF specified by the user.

In one or more embodiments, as discussed above, the command for updating the RCF may not include the first label matching the second label included in the RCF to be updated. Rather, the command for updating the RCF may include positional information specifying where the payload is to be inserted in the RCF. For example, in an addition (i.e., insertion) modification type, the command may include positional information such as, but is not limited to, "add at the end of a function" or "add at the beginning of a function." In such an event, the CLI parses (in Step 216) the matching RCF to determine the target insertion position using the positional information. Once the target insertion position is identified, the process proceeds to Step 218.

If the CLI determines that the matching RCF includes a second label matching the first label (i.e., YES in Step 216), the method proceeds to Step 218 where the matching RCF is updated based on the type of modification and payload included in the command (i.e., the update). More specifically, in one or more embodiments disclosed, the portion of the matching RCF labeled using the second label is updated based on the type of modification and the payload.

In one or more embodiments disclosed, the type of modification may be any form of modification for changing a content of the RCF (e.g., deletion, replacement, insertion/addition, etc.). The payload may determine how the RCF is to be modified. For example, in an insertion/addition example, the payload may include content to be inserted/added to the RCF. As a further example, in a replacement example, the payload may include both content to be added/inserted and removed from the RCF. Examples of payloads are shown in more detail below in FIG. 3.2.

Table 1 below shows non-limiting examples of possible modifications to the RCF including the initial code, the type of modification including the command, and the final code after the type of modification is implemented. Derivatives of the examples shown in Table 1 may also be applied to the modification of the RCFs.

In below Table 1, for purposes of illustration, any additions to the RCFs are shown using underlining One of ordinary skill in the art would appreciate that no underlining, or any similar markings, may be applied during an actual modification of an RCF. Further, in below Table 1, the Initial Code column shows code in an existing RCF stored in a database. The Modification Type column illustrates a type of modification to be implemented on the initial code. The Command column illustrates RCF modification commands received through the CLI to be executed on the initial code. Finally, the Resulting Code column shows the results (i.e., the updated/edited code) of executing the command on the initial code.

TABLE 1

Non-limiting Examples of Modifications to the RCF Code

| Initial Code | Mod. Type | Command | Resulting Code |
|---|---|---|---|
| function FOO( ) {<br>@sec1<br>  if match10 {set10;}<br>else<br>@sec2<br>  {set20;}<br>} | Replace | code replace if-block<br>function FOO @sec1<br>@sec1<br>  ifmatch1A {set1A;}<br>EOF | function FOO( ) {<br>@sec1<br>  if match1A {set1A;}<br>else<br>@sec2<br>  {set20;}<br>} |
| function FOO( ) {<br>@sec1<br>  if match1A {set1A;}<br>else<br>@sec2<br>  {set20;}<br>} | Deletion | code delete if-block<br>function FOO @sec1<br>EOF | function FOO( ) {<br>@sec2<br>  {set20;}<br>} |
| function FOO( ) {<br>@sec2<br>  {set20;}<br>} | Addition | code insert if-block<br>function FOO<br>@sec1<br>  if match10 {set10;}<br>EOF | function FOO( ) {<br>@sec1<br>  if match10 {set10;}else<br>@sec2<br>  {set20;}<br>} |
| function FOO( ) {<br>@sec10<br>  if match10 {set10;}<br>} | Addition | code insert if-chain<br>function FOO before<br>@sec10<br>@sec0<br>  if match0 {set0;}<br>  else<br>@sec5<br>  ifmatch5 {set5;}<br>EOF | function FOO( ) {<br>@sec0<br>  if match0 {set0;} else<br>@sec5<br>  if match5 {set5;}<br>@sec10<br>  if match10 {set10;}<br>} |
| func FUNC1( ) {<br>@main {<br>  # action1<br>}<br>} | Addition | code insert block<br>function FUNC1<br>before @main<br>@pre {<br>  # action0<br>}<br>EOF | func FUNC1( ) {<br>@pre {<br>  # action 0<br>}<br>@main {<br>  # action1<br>}<br>} |
| func FUNC1( ) {<br>@pre if (expr0) {<br>  # action 0<br>} else<br>@main if (expr1) {<br>  # action1<br>}<br>} | Replace | code replace block<br>function FUNC1<br>@pre<br>*payload*<br>EOF | RETURN<br>ERROR<br>TO USER<br>Class "block" in<br>command does not<br>match class "if-block"<br>of label @pre in the<br>initial code. |

TABLE 1-continued

Non-limiting Examples of Modifications to the RCF Code

| Initial Code | Mod. Type | Command | Resulting Code |
|---|---|---|---|
| func FUNC1( ) {<br>  @main {<br>    # action0<br>  }<br>} | Addition | code insert if-block<br>function FUNC1<br>before @main<br>*payload*<br>EOF | RETURN<br>ERROR<br>TO USER<br>Cannot insert "if-block"<br>outside of an "if-chain"<br>(i.e., the "if-block" class<br>in the command does not<br>support the "block" class<br>in the initial code). |
| func FUNC1( ) {<br>  @main {<br>    # action0<br>  }<br>} | Replace | code replace block<br>function FUNC1<br>@main<br>@main if (expr1) {<br>  # action1<br>}<br>EOF | RETURN<br>ERROR<br>TO USER<br>Payload includes<br>code associated with<br>class "if-block".<br>Class "block" in the<br>command does not<br>match with class<br>"if-block" in the<br>payload. |
| func FUNC1( ) {<br>  @main if (expr1) {<br>    # action1<br>  }<br>} | Replace | code replace if-block<br>function FUNC1<br>@main<br>@main {<br>  # action2<br>}<br>EOF | RETURN<br>ERROR<br>TO USER<br>Payload includes code<br>associated with class<br>"block".<br>Class "if-block" in the<br>command does not<br>match with class "block"<br>in the payload. |

Although the above non-limiting examples use labels such as "@sec1" that include a numerical character, the numerical character and the naming scheme of these labels should not be interpreted to denote any specific order, placement, and/or position of any of the code and/or labels included in any of the above RCFs.

As shown in above Table 1, in addition to the type of modification, the CLI enables a number of automated features to be added for RCF policy management. These features include, but are not limited to, (i) automatic syntactic error detection that reduces the chance for error introduction via changes to RCFs and (ii) detection and implementation of stylistic features in the RCFs that improve the manageability of RCFs modified via the CLI.

For example, in the second addition modification type example in Table 1, the new text (i.e., "@sec0 if match0 {set0;} else" and "@sec5 if match5 {set5;}") is added while including the same levels of indentations (i.e., the syntactic style) of the original line of text (i.e., "@sec10 if match10 {set10;}"). This can be done, for example, by: identifying a line of the payload having a lowest level of indentation (i.e., @sec0 if match0 {set0;}); identifying a relative level of indentation relative to the lowest level of indentation for each other line of the payload (i.e., all other lines in the payload after @sec0 if match0 {set0;}); setting an indentation level of the line of the payload inserted in the routing control function (i.e., @sec0 if match0 {set0;}) else to the indentation level of the second label (i.e., the indentation level of @sec10 if match10 {set10;}); and setting an indentation level of the other lines of the payload (i.e., all lines after @sec0 if match0 {set0;} else) inserted in the routing control function based on the identified relative level of indentation for each respective other line. Additionally, in the event the adding modification includes the addition of an "if-block" instead of an "if-chain", an "else" statement will be added after the first "-if" condition to complete the syntactic style of the lines of code within the "if-block". The automatic implementation of the stylistic features of the RCF may be implemented by the CLI parsing the lines directly before and directly after where the payload is to be added to determine the most applicable (i.e., most relevant) syntactic style to be applied to the added payload.

In the other types of modifications (i.e., replace and deletion) shown in Table 1, the syntactic styles of the portion to be replaced or deleted are adapted by the CLI. In particular, in the case of a deletion, the syntactic styles surrounding the deleted portion(s) are adapted by the CLI. Consequently, in one or more embodiments disclosed, desirable levels of indentation may be automatically implemented in the modified RCFs thereby reducing the cognitive burden on administrators when reading and interpreting the modified RCFs FIG. 2.3 shows a flowchart describing a method for enhancing a network in accordance with one or more embodiments disclosed herein. The method may be performed by, for example, one or more components of a network device (e.g., 100, FIG. 1.2). Other entities may perform the method of FIG. 2.3 without departing from embodiments disclosed herein.

While the various steps in the flowchart shown in FIG. 2.3 are presented and described sequentially, one of ordinary skill in the relevant art, having the benefit of this document, will appreciate that some or all of the steps may be executed in different orders, that some or all of the steps may be combined or omitted, and/or that some or all of the steps may be executed in parallel or partially overlapping in time or manner.

In Step 230, the route and packet manager (e.g., 106, FIG. 1.2) of the network device determines that the RCF database has been updated and obtains an unprocessed route from the route database. As discussed above, in one or more embodiments disclosed, an unprocessed route is a route that has not been processed (i.e., updated) to reflect new route configurations in the updated RCF database.

In Step 232, the route and packet manager processes the unprocessed route using the updated RCF database to reflect any newly added and/or modified route configurations to the unprocessed route. In particular, in one or more embodiments disclosed herein, the updated RCF database includes changes to the configuration and/or operations of the network device intended by the user through the transmission of the command to update the RCF. These changes to the configuration and/or operations of the network device are applied to the processing of the unprocessed route such that the unprocessed routes are processed to reflect the changes.

In Step 234, the route and packet manager implements packet forwarding to forward subsequently received packet on the newly processed route reflecting the added and/or modified route configurations. For example, the added and/or modified route configurations may require a packet to be forwarded to be held at the network device for a predetermined time before the packet is forwarded. The route and packet manager ensures that such a route configuration of holding a packet is executed on all packets received subsequent to the RCF database being updated through the commitment of the updated RCF.

To further clarify embodiments disclosed herein, a non-limiting working example of modifying fragments of an RCF is provided in FIGS. 3.1-3.3. The example is intended to highlight various aspects of the disclosure. However, the example should not be construed as limiting the disclosure in any way.

Beginning of Working Example

Imagine a scenario where a user wishes to modify an RCF stored in a RCF database of a network device (e.g., 100, FIG. 1.2). FIG. 3.1 shows an example of the RCF database (300) including the RCF (301) that the user wishes to modify. FIG. 3.1 further shows that the RCF (301) includes multiple fragments (302A-302C) that make up the entirety of the RCF (301). Each of these fragments (302A-302C) includes at least one of the labeling schemes discussed above in Example 1 and Example 2, and may also include one or more route configurations to be implemented by the network device.

Now further assume that the user only wishes to add a new fragment before fragment (302B) shown in FIG. 3.1. At this point, the user transmits a command (304) as shown in FIG. 3.2 to modify the RCF (301). In particular, as shown in FIG. 3.2, the command (304) includes an RCF name (e.g., "function FOO"), a type of modification including a class (e.g., "insert if-block" and "before"), a first label (e.g., "@section50"), and a payload (e.g., "@section101 if match 5 {set5;}"). As further shown in FIG. 3.2, the first label (i.e., "@section50") matches a second label (e.g., "@section50") in fragment (302B) of the RCF (301). Thus, when a command line interface (CLI) of the network device parses the command (304), the CLI will know that the command (304) is for adding a new fragment before fragment (302B) of the RCF (301) shown in FIG. 3.1.

Finally, assume that the RCF (302) is modified (i.e., updated) by the CLI to implement the changes included in the command (304). The result of this modification is shown in the updated RCF (305) of FIG. 3.3. In particular, FIG. 3.3 shows that fragment (302D) is now added before fragment (302B) in the updated RCF (305); the fragment (302D) includes a syntactic addition of the word "else" in the if-block in this example. This fragment (302D) of updated RCF (305) is then committed and used by the network device to update route configurations of existing routes stored within the network device. The modifications to RCF (305) are shown using underlining One of ordinary skill in the art would appreciate that no underlining, or any similar markings, may be applied during an actual modification of an RCF.

End of Working Example

As discussed above, embodiments disclosed herein may be implemented using computing devices. FIG. 4 shows a diagram of a computing device in accordance with one or more embodiments disclosed herein. Computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), communication interface (412) (e.g., Bluetooth interface, infrared interface, network interface, optical interface, etc.), input devices (410), output devices (408), and numerous other elements (not shown) and functionalities. Each of these components is described below.

In one embodiment disclosed herein, computer processor(s) (402) may be an integrated circuit for processing instructions. For example, the computer processor(s) may be one or more cores or micro-cores of a processor. Computing device (400) may also include one or more input devices (410), such as a touchscreen, keyboard, mouse, microphone, touchpad, electronic pen, or any other type of input device. Further, communication interface (412) may include an integrated circuit for connecting computing device (400) to a network (not shown) (e.g., a local area network (LAN), a wide area network (WAN) such as the Internet, mobile network, or any other type of network) and/or to another device, such as another computing device.

In one embodiment disclosed herein, computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to computer processor(s) (402), non-persistent storage (404), and persistent storage (406). Many different types of computing devices exist, and the aforementioned input and output device(s) may take other forms.

Embodiments disclosed herein may provide the ability to modify fragments of RCFs stored in a network device providing packet forwarding services. By doing so, recommitment of the entirety of the RCF body (i.e., all of the programming code making up the RCF) as a new version of a previously stored RCF can advantageously be avoided. Consequently, computing resources of the network device can be more effectively allocated to other tasks (e.g., packet forwarding, route establishment, etc.).

Additional embodiments disclosed herein may reduce the cognitive burden on administrators and/or other persons for making changes to the operation of the network (e.g., making changes to routing configurations of network devices within the network). By enabling granular changes to be made to existing RCFs in a network device's database, a large burden on administrators of the network device can be avoided through the elimination of conventional methods requiring the editing of the entire RCF body just to implement the granular changes. Consequently, administrators and/or other persons may more also easily perform maintenance, upgrade, or otherwise modify the operation of the network devices.

Thus, embodiments disclosed herein may address the problem of limited resources of both networks and/or persons for managing networks. While embodiments have been described as addressing one or more specific challenges relating to network environments, embodiments disclosed herein are broadly applicable to addressing many networking challenges and the embodiments should not be construed as only addressing or being usable to solve the specific challenges discussed above.

While embodiments described herein have been described with respect to a limited number of embodiments, those skilled in the art, having benefit of this disclosure, will appreciate that other embodiments can be devised which do not depart from the scope of embodiments disclosed herein. Accordingly, the scope embodiments described herein should be limited only by the attached claims.

What is claimed is:

1. One or more non-transitory computer readable storage media comprising computer-executable instructions that, when executed by one or more processors for a network device, cause the one or more processors to:
   obtain a request for commitment of a routing control function to a database, wherein the routing control function:
   specifies at least a step for processing a class of routes, and
   comprises a plurality of labels that delineate a plurality of portions of the routing control function; and
   update the database based on the routing control function to obtain a first updated database;
   obtain a command that specifies:
   a routing control function name of the routing control function,
   a first label,
   a type of a modification for the routing control function, and
   a payload that specifies a change to the routing control function;
   identify a portion of the plurality of portions of the routing control function having a second label that matches the first label, wherein the second label is one of the plurality of labels;
   identify a syntactic style associated with the portion of the plurality of portions;
   update, to obtain an updated routing control function, the routing control function based on:
   the type of the modification,
   the payload,
   the portion of the plurality of portions, and
   the syntactic style;
   initiate commitment of the updated routing control function to the database;
   after the updated routing control function is committed to the database:
   obtain an unprocessed route, and
   process the unprocessed route using a portion of the database corresponding to the committed updated routing control function to obtain a processed route; and
   provide packet forwarding services based on the processed route.

2. A network device that provides packet forwarding services, comprising:
   one or more processors;
   a command line interface configured, when executing on the one or more processors, to:
   obtain a command, for updating a routing control function stored in a database of the network device, wherein the command specifies positional information in the routing control function,
   identify a portion of the routing control function based on the positional information,
   identify a syntactic style associated with the portion of the routing control function,
   make a modification to the routing control function stored in the database, wherein the modification is based on:
   the command,
   the portion of the routing control function, and
   the syntactic style, and
   update operation of the network device based on the modified routing control function; and
   a route manager configured, when executing on the one or more processors, to process a route for forwarding packets received by the network device based on the modified routing control function, after the operation of the network device is updated, to obtain a processed route for forwarding the packets.

3. The network device of claim 2, wherein the positional information is specified using a label.

4. The network device of claim 2, wherein the positional information is specified as a target position in the routing control function.

5. The network device of claim 2, wherein
   the command further specifies a payload, and
   the modification is further based on the payload.

6. The network device of claim 5, wherein making the modification to the routing control function comprises:
   inserting the payload at a location within the routing control function based on the portion of the routing control function; and
   formatting the payload based on the syntactic style.

7. The network device of claim 3, wherein the portion of the routing control function comprises a second label that matches the label.

8. The network device of claim 6, wherein identifying the syntactic style associated with the portion of the routing control function comprises identifying an indentation level of the second label within the routing control function.

9. The network device of claim 8, wherein the routing control function comprises human-readable text in a format that enables separable elements of the routing control function to be distinguished, wherein the format comprises different levels of indentation for different separable elements.

10. The network device of claim 8, wherein formatting the payload based on the syntactic style comprises:
    identifying a line of the payload having a lowest level of indentation;
    identifying a relative level of indentation relative to the lowest level of indentation for each other line of the payload;
    setting an indentation level of the line of the payload inserted in the routing control function to the indentation level of the second label; and setting an indentation level of the other lines of the payload inserted in the routing control function based on the identified relative level of indentation for each respective other line.

11. The network device of claim 2, wherein the operation of the network device is updated by committing the modification to a data structure, wherein the route manager processes the route based on a function compiled using information stored in the data structure.

12. The network device of claim 11, further comprising:
a packet processor configured, when executing on the one or more processors, to:
obtain a packet;
make a forwarding decision for the packet based, at least in part, on the processed route; and
forward the packet to a second network device based on the forwarding decision.

13. The network device of claim 2, wherein making the modification to the routing control function further comprises:
making a determination that the command is a replacement;
based on the determination:
using the positional information to determine a location for inserting a payload; and
executing the replacement by deleting the portion of the routing control function and inserting the payload at the location.

14. The network device of claim 2, wherein making the modification to the routing control function further comprises:
making a determination that the command is an addition;
using the positional information to determine a location for adding the payload; and
adding the payload at the determined location.

15. The network device of claim 2, wherein making the modification to the routing control function comprises:
making a determination that the command is a deletion of content within the portion of the routing control function;
using the positional information to identify content of the routing control function to be deleted; and
deleting the content identified using the positional information.

16. The network device of claim 2, wherein the command line interface is configured, when executing on the one or more processors, to:
in response to receiving the command and prior to making the modification to the routing control function, determine whether the command can be executed.

17. The network device of claim 16, wherein determining whether the command can be executed comprises:
determining a first class included in a type of modification specified by the command;
determining a second class associated with the portion of the routing control function; and
determining that the command can be executed if the first class supports the second class.

18. The network device of claim 16, wherein determining whether the command can be executed comprises:
determining a first class included in a type of modification specified by the command;
determining a second class included in a payload specified by the command; and
determining that the command can be executed if the first class matches the second class.

19. A method for modifying a fragment of a routing control function stored in a network device that provides packet forwarding services, the method comprising:
obtaining a command, for updating the routing control function, specifying a modification to the routing control function;
determining that the command can be executed based on classes included in the command and the routing control function;
identifying a portion of the routing control function specified in the modification;
identifying a syntactic style associated with the portion of the routing control function; and
making a modification to the routing control function to obtain a modified routing control function, wherein the modification is based on:
the command,
the portion of the routing control function, and
the syntactic style; and
committing the modification to a data structure storing the routing control function to update an operation of the network device,
wherein a route for forwarding packets of the network device is processed based on the modified routing control function, after the operation of the network device is updated, to obtain a processed route for forwarding the packets.

20. The method of claim 19, wherein
the modification specifies a label and a payload,
the portion of the routing control function comprises a second label matching the first label, and
the modification is further based on the payload.

* * * * *